United States Patent [19]

DenHartog et al.

[11] Patent Number: 4,961,463
[45] Date of Patent: Oct. 9, 1990

[54] THERMOSYPHON CONDENSATE RETURN DEVICE

[75] Inventors: Stephen L. DenHartog, Hanover, N.H.; John P. Zarling, Fairbanks, Ak.; Francis D. Haynes, Etna, N.H.

[73] Assignee: The United States of America as represented by the Secretary of the Army, Washington, D.C.

[21] Appl. No.: 343,219

[22] Filed: Apr. 26, 1989

[51] Int. Cl.⁵ ............................................. F28D 15/02
[52] U.S. Cl. .................................. 165/45; 165/104.21; 62/260
[58] Field of Search ................ 165/45, 104.21; 62/260

[56] References Cited

U.S. PATENT DOCUMENTS

| | | | |
|---|---|---|---|
| 2,026,423 | 12/1935 | Fiene | 165/104.21 |
| 3,217,791 | 11/1965 | Long | 165/45 |
| 3,332,476 | 7/1967 | McDougal | 165/104.21 |
| 3,771,590 | 11/1973 | Best et al. | 165/45 |
| 3,828,845 | 8/1974 | Waters | 165/45 |
| 4,320,720 | 3/1982 | Streed | 165/45 |
| 4,382,466 | 5/1983 | Shiraishi . | |

FOREIGN PATENT DOCUMENTS 16983  2/1979  Japan ............................. 165/104.21
676847 7/1929  U.S.S.R. ............................. 165/45

Primary Examiner—Albert W. Davis, Jr.
Attorney, Agent, or Firm—Darrell E. Hollis

[57] ABSTRACT

A thermosyphon for removing heat from a permafrost foundation, the invention can be installed in a frozen foundation with an evaporator section disposed either horizontally or with a negative (up) slope, thereby allowing the evaporator section of the thermosyphon to be buried in a more shallow location of the foundation than is possible with conventional thermosyphon devices. The thermosyphon of the invention has a condensate collection ring near the lowest point but higher than any point in the evaporator of a condenser section which extends above the permafrost foundation and into heat exchange contact with low-temperature above-ground air. Condensate formed in the condenser section by heat exchange with the air is collected in the collection ring and ducted through a condensate return tube to a desirable location within the evaporator section, usually the extreme distal end thereof. The present thermosyphon is thus capable of removing heat from a permafrost foundation or the like even when the evaporator section is disposed horizontally or at a negative slope.

20 Claims, 2 Drawing Sheets

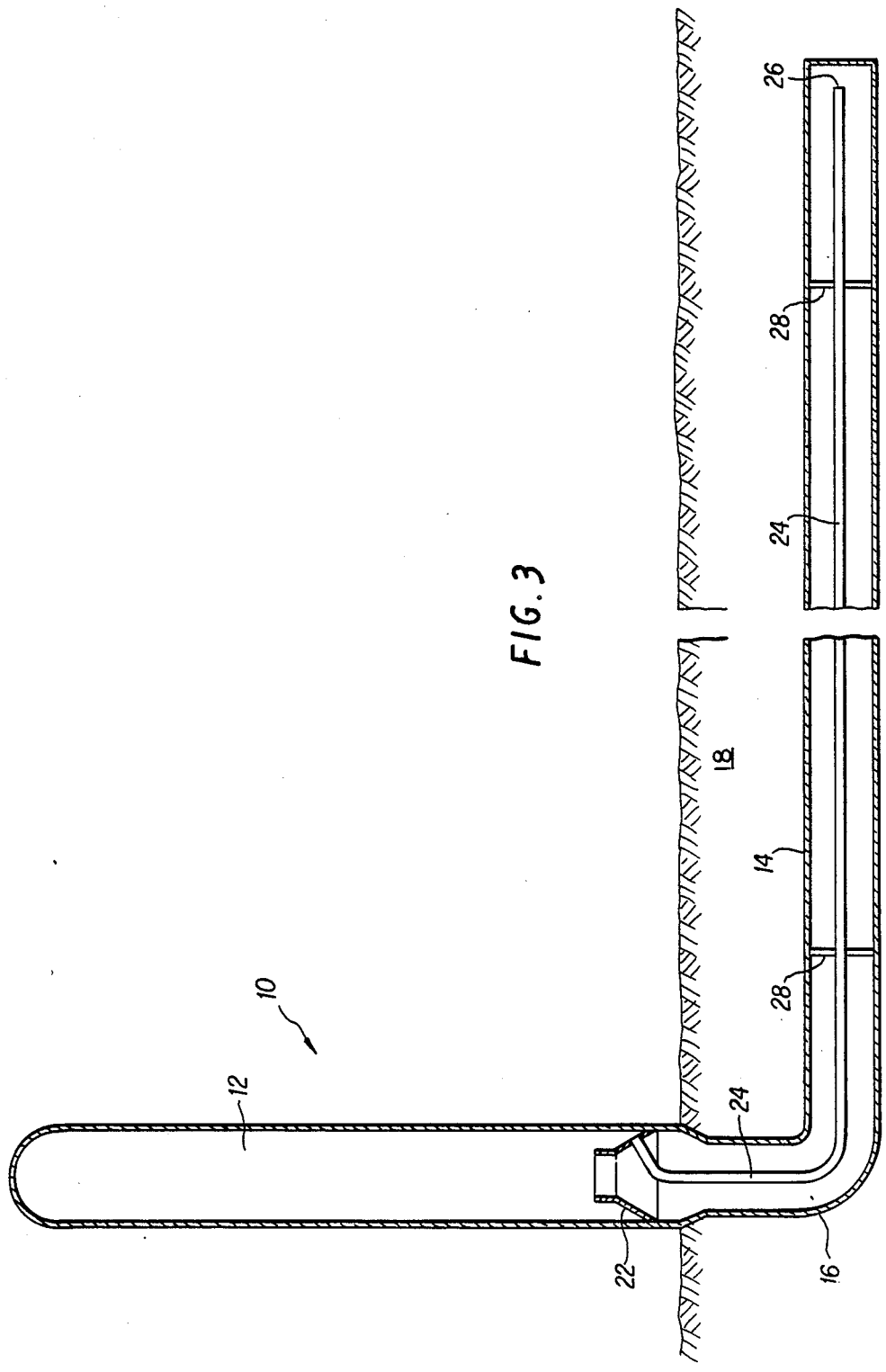

THERMOSYPHON CONDENSATE RETURN DEVICE

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

The invention relates generally to the removal of heat from a permafrost foundation and particularly to such heat removal by heat exchange with the air through use of a thermosyphon capable of functioning with a horizontally or negatively sloped evaporator section.

2. Description of the Prior Art

Heat exchange devices known as thermosyphons have previously been used for removal of heat from permafrost foundations over which buildings, roads, etc. have been built. In such situations, the man-made structures alter the surface temperature regime of the permafrost foundation and can cause thawing of large areas of the permafrost with subsequent subsidence. This inevitable subsidence removes support from the foundation and results in destruction of the building or roadway. Prior thermosyphonic devices used for maintaining a permafrost foundation in a frozen condition have been installed with evaporator sections disposed with a "positive" slope (down slope) since such a down slope is necessary so that condensate within a thermosyphon can flow downhill to be re-evaporated within the evaporator section. Such prior devices must be buried relatively deeply within the permafrost, the excavation incidental to such burial adding great expense to the overall cost of the building or roadway. Additionally, great care must be taken in the installation of prior thermosyphons to make certain that the evaporator sections of such thermosyphons are disposed at a positive angle, typically a positive angle of 3 degrees (1 in 20) or greater, in order for the prior thermosyphon to function properly. In the event that a prior thermosyphon is incorrectly installed with the evaporator section disposed horizontally or with a negative slope (up slope), condensate puddles at the low point of the thermosyphon and little or no cooling takes place over the majority of the evaporator section Note the low point of the thermosyphon is not necessarily in the evaporation section. Evaporation takes place only in the warm in ground portion of the evaporator section not in that portion of the evaporator section lying outside the ground. An improved thermosyphon device has therefore been needed in the art so that the depth of excavation for installation of such a device is reduced and so that the angle of installation of the evaporator section is less critical and can be either horizontally sloped, negatively sloped or positively sloped with the thermosyphon functioning properly to remove heat from a permafrost foundation or the like.

Prior thermosyphon devices are disclosed by Siraishi in U.S. Pat. No. 4,382,466; by Long in U.S. Pat. No. 3,217,791, and by Waters in U.S. Pat. No. 3,828,845. Shiraishi removes heat from the condenser section of a thermosyphon but does not provide a condensate collecting structure which would allow the Shiraishi thermosyphon to be installed in a permafrost foundation or similar situation with an evaporator section in a horizontal disposition or with a negative slope. Long discloses the use a thermosyphon for maintaining frozen temperatures within a permafrost foundation in arctic regions for on-grade construction. Long does not provide a condensate collection struction in the disclosed thermosyphon. As such the struction of Long is exemplary of the prior art devices upon which the present invention intends improvement. Waters provides vertically oriented thermosyphons, the struction of Waters not being amenable to installation with the evaporator section in a horizontal disposition or in a disposition having a negative slope. In U.S. Pat. No. 2,026,423, Fiene provides a device capable of temperature control within electrical apparatus. However, the struction of Fiene is not capable of moving heat from one location to another as is the case with thermosyphon. McDougal, in U.S. Pat. No. 3,332,476, provides a structure for cooling a carburetor, the structure being operable in a manner of a thermosyphon. However, McDougal does not provide a condensate collector or return structure as does the present invention and is incapable of functioning in the manner of the present thermosyphon. In U.S. Pat. No. 3,771,590, Best et al provide a condensate return tube within an evaporator assembly. However, the structure of the Best et al device only functions when installed vertically within a permafrost foundation. Bert et al, in U.S. Pat. No. 3,791,443, provide a device for circulating cold air beneath a building in order to prevent melting of permafrost upon which the building has been constructed. The Bert et al systems does not, however, comprise a thermosyphon but merely a device for flowing relatively cold air into contact with portions of permafrost foundations which have been heated by a building or roadway which has been constructed on the permafrost foundation.

The prior art thus does not provide a thermosyphonic device capable of functioning in the manner of the present invention and with the advantages attendant thereto which the present invention provides.

SUMMARY OF THE INVENTION

The invention provides an improved thermosyphonic device capable of removing heat from a permafrost foundation or the like. As with prior thermosyphonic devices, the present invention comprises a sealed type filled with a fluid which changes phase. The fluid is subjected to different temperatures at opposite ends of the device, the fluid traveling around a loop defined by the device and being driven by changes in density. Although some thermosyphonic devices do not depend on phase change for operation, the present invention does comprise a two-phase thermosyphon wherein the working fluid and its pressure are closen so that the "warm" end of the thermosyphon experiences a temperature which is above the boiling point of the fluid while the "cold" end of the thermosyphon experiences a temperature which is below the condensation temperature of the fluid.

Two-phase thermosyphonic devices comprise typically vertically oriented condenser section which is located in an environment having a temperature which is below the condensation temperature of the working fluid. An example is the preferred working environment of the present thermosyphon which involves disposition of the condenser section of the thermosyphon above ground level or above the permafrost level. The condenser section communicates with an evaporator section which is disposed below ground or within a permafrost foundation and typically a permafrost foundation which is being at lease locally heated by virtue of a building or roadway built over the permafrost foundation. Accordingly, the evaporator section of the thermosyphon is subjected to a temperature which is relatively warm, when considered relative to that temperature experienced by the condenser section. The working fluid is thus caused to evaporate within the evaporator section with the resulting vapors moving from the evaporator section into the condenser section. The evaporator working fluid is then condensed within the condenser section on exposure to relatively colder temperatures, that is, freezing air temperatures as an example, and the condensed working fluid drains from the condenser section back into the evaporator section to begin a new heat exchange cycle.

As has been previously noted herein, prior thermosyphonic devices require installation with the evaporator section having a positive slope, that is, a downhill slope of at least one in twenty so that the working fluid condensate can flow "down hill" into the evaporator section. A positive slope of a thermosyphon evaporator section is therefore defined as a slope where the evaporator section pitches downwardly.

The present thermosyphonic device includes a condensate collection ring located within the condenser section and which collects the working fluid condensate and pools the condensate at a low point within the ring for drainage by means of a condensate return to a desired location within the evaporator section of the device. Typically, the condensate is drained to the distal end of the evaporator section. Accordingly, a thermosyphon configured according to the present invention can have an evaporator section with a slope of zero, that is, horizontal, or even with a negative slope, that is up hill, as long as the condensate collector ring is disposed above the outfall of the condenser section. The present thermosyphonic device can thus be installed with the evaporator section either located horizontally within a permafrost foundation or with a negative, that is, up hill, slope or even with a positive, that is, down hill, slope, as with conventional thermosyphonic devices to the end that criticality does not exist for installation of the present thermosyphonic device within a permafrost foundation. In essence, the present thermosyphon functions regardless of the angle of installation of the evaporator section thereof whereas prior thermosyphonic devices fail in operation if the evaporator sections of such devices are not installed with the evaporator sections at a positive, that is, down hill, slope. The present thermosyphon can thus be installed more readily and with less criticality of orientation than can prior devices. Further, in large area installations, the present thermosyphon can be installed with less excavation and thus with reduced cost.

Accordingly, an object of the invention is to provide a thermosyphonic device which can function to remove heat from a permafrost foundation or the like and with a reduced criticality of orientation within the permafrost foundation.

It is another object of the invention to provide a thermosyphon having a structure for collecting working fluid condensate within a condenser section of thermosyphon for return of the condensate to a desired location within an evaporator section of the thermosyphon, typically the distal end of the evaporator section, so that the thermosyphon can function with the evaporator section in a horizontal disposition within a permafrost foundation or even with a negative, that is, up hill, slope within the foundation.

A further object of the invention is to provide a thermosyphon device operable with its evaporator section disposed at any angle within a permafrost foundation or the like, thereby simplifying installation of the thermosyphon and reducing the cost of installation especially within large area situations. Further objects and advantages of the invention will become more readily apparent in light of the following detailed description of the preferred embodiment.

DESCRIPTION OF THE PREFERRED EMBODIMENT

Figure 1:
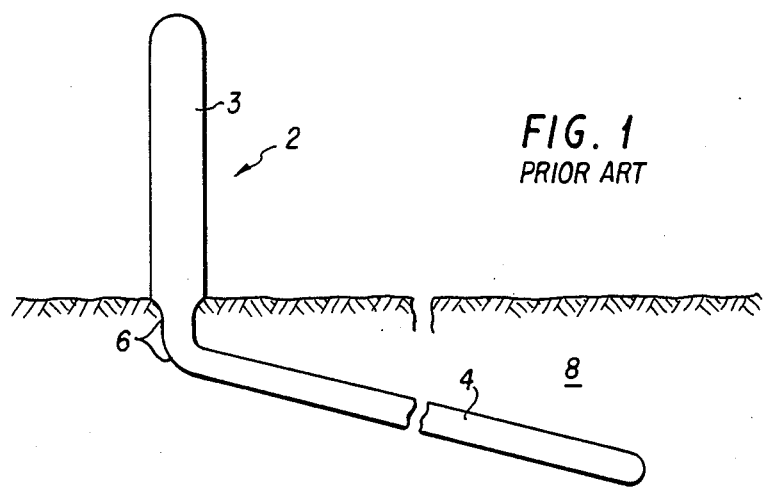
FIGURE 1 is a view of a conventional thermosyphon having an evaporator section which is disposed at a positive or down hill slope.

Referring now to the drawings and particularly to FIG. 1, a conventional thermosyphon is seen at 2 to comprise a usually vertically oriented condenser section 3 and an evaporator section 4 which has at least a 3 degree "positive" slope or down slope so that condensate forming in the condenser section 3 can move into the evaporator section 4 by means of gravity flow. In the conventional thermosyphon 2, it is necessary for the evaporator section 4 to be disposed at a downward angle so that the condensate can flow to the bottom of the evaporator section 4 and the entire evaporator section 4 can remove heat from a permafrost foundation 8 within which the thermosyphon 2 is installed. In the event that the thermosyphon 2 were incorrectly installed within the permafrost foundation 8 with the evaporator section 4 disposed either horizontally or at a negative (up) slope, the condensate would puddle at the low point within the thermosyphon, typically the area of bend 6 and little or no cooling would take place over the majority of the evaporator section 4.

In conventional thermosyphonic devices, a positive slope of at least one in twenty is necessary so that condensate can flow down hill from condenser section 3 to evaporator section 4. This positive slope is necessary for transfer of heat from the distal end of the evaporator section 4 and thus to maximize heat exchange from the foundation 8 to relatively colder air which is in contact with the condenser section 3 A positive slope can thus be defined as a slope whereby the evaporator section 4 pitches downwardly from the bend 6. For large area installations, this downward pitch results in a relatively deeper burial of the thermosyphon 2 and adds greatly to the expense of the installation due to the requirement for additional excavation. Incorrect installation of the thermosyphon 2 such that the evaporator section 4 is disposed horizontally or at a negative slope, that is, an up hill slope, results in an inoperative device and therefore little or no removal of heat from the permafrost foundation 8.

Figure 2:
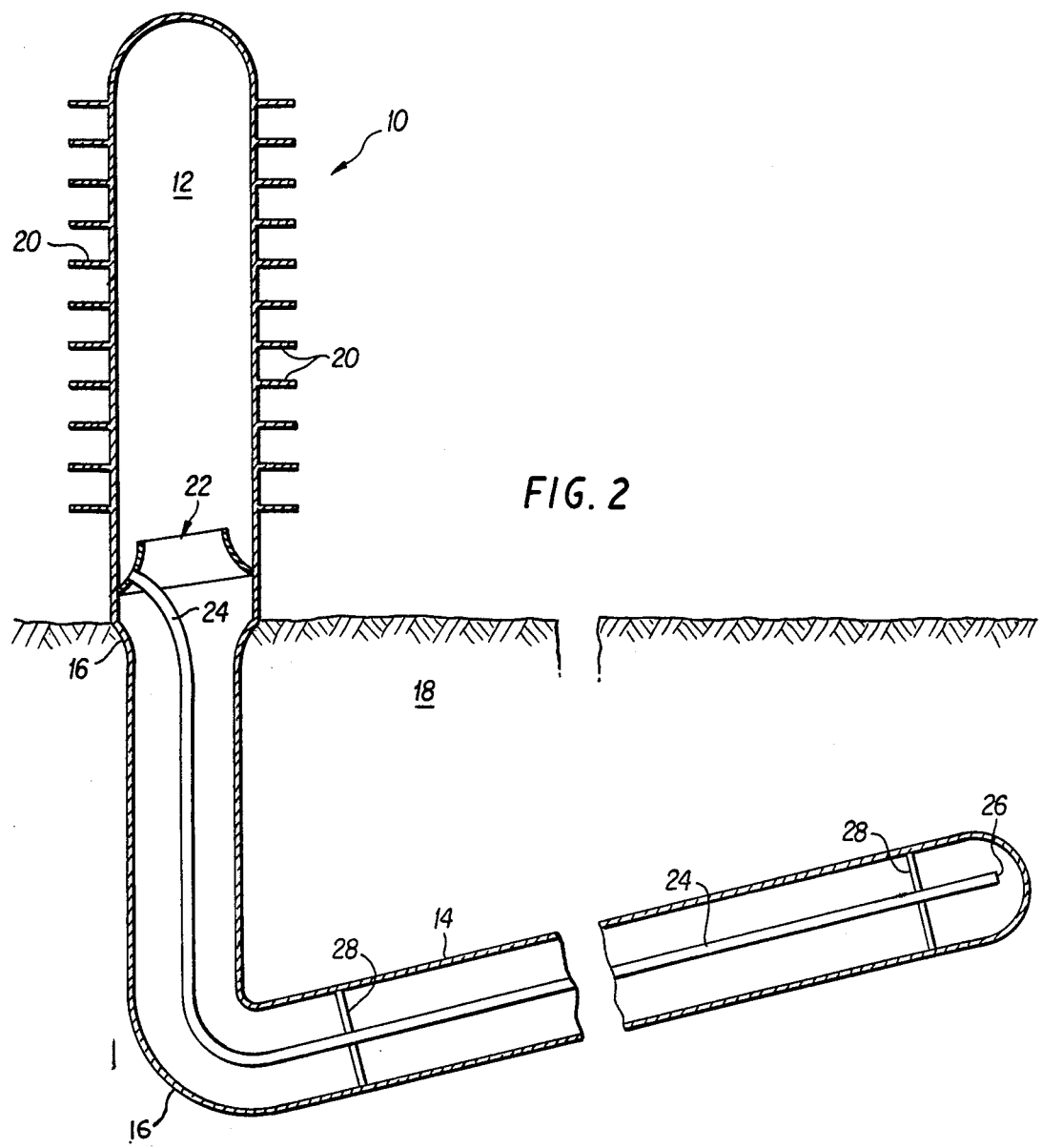
FIG. 2 is a view of the thermosyphon of the present invention and having a condensate collector within the condenser section with a condensate return tube extending from the condensate collector to the distal end of the evaporator section, the evaporator section being shown disposed at a negative or up hill slope; and, FIG. 3 is a view of the thermosyphon of the present invention illustration the condensate collector and condensate return tube, the evaporator section of the thermosyphon being disposed horizontally within a permafrost foundation.

Referring now to FIGS. 2 and 3, the improved thermosyphon of the invention is seen at 10 to comprise a condenser section 12 and an evaporator section 14 joined at the point where the thermosyphon enters the ground or where there is a change in temperature. As is conventional with thermosyphonic devices, the sections 12 and 14 effectively form a sealed tubular structure containing a working fluid (not shown). The working pressure and fluid is chosen to have a condensing temperature which is below the temperature of the "cold" end or condenser section 12 and a boiling point which is above the temperature of the "warm" end or evaporator section 14. As is seen in FIG. 2, the evaporator section 14 of the thermosyphon 10 can be disposed at a negative slope, that is, an up hill slope. The thermosyphon 10 of FIG. 3 is essentially of the same construction as the thermosyphon 10 of FIG. 2 but with the evaporator section 14 disposed at a horizontal slope, that is, at a zero angle. Conventional thermosyphonic devices such as the thermosyphon 2 of FIG. 1 cannot function with an evaporator section disposed at a negative slope or at a horizontal disposition within a permafrost foundation.

The thermosyphons 10 of FIGS. 2 and 3 are both disposed with the condenser sections 12 extending above ground level and with the evaporator sections 14 buried in a frozen permafrost foundation 18. In those situations within which a thermosyphon according to the invention is utilized, the permafrost foundation 18 is being warmed by a building, roadway or other structure (not shown) which is disposed on the permafrost foundation 18. The thermosyphons 10 act to remove this heat from the foundation 18 through heat exchange between the working fluid of the thermosyphons 10 and the permafrost foundation 18 and subsequent heat exchange between the working fluid and relatively cold air which contacts the condenser sections 12. The condenser sections 12 can be provided with cooling fins 20 which increase heat exchange between evaporator working fluid flowing into the condenser sections 12 and the relatively colder air contacting exterior surfaces of said sections 12.

Since the thermosyphon 10 of FIG. 2 differs from the thermosyphon 10 of FIG. 3, only in the slope of the evaporator section 14, the internal structure of the thermosyphon 10 of FIG. 3 will be described in detail so that the function of both of the thermosyphons 10 can be readily understood. As seen in FIG. 3, a collector ring is seen at 22 to be disposed near the bottom of the condenser section 12, the ring being annular in conformation with its outer perimeter edge flushly contacting inner wall surfaces of the condenser section 12. Accordingly, evaporator working fluid flowing upwardly into the condenser section 12 from the evaporator section 14 passes through the inner annulus of the collector ring 22 and condenses on inner wall surfaces of the condenser section. The condensate thus formed then flows downwardly along the inner wall surfaces of the condenser section 12 and collects in the inner ring 22. The ring 22 slopes downwardly from the horizontal such that the condensate is collected at a low point thereof. A condensate return tube 24 communicates with the collector ring 22 at the low point thereof and ducts the condensate into the evaporator section 14 to a desired location within the evaporator section 14. The condensate return tube 24 has a length which will act to deposit the condensate at the desired location within the evaporator section 14. Typically, the extreme distal end 26 of the evaporator section 14 comprises the location to which the condensate is ducted and deposited within said section 14. As can be seen in FIG. 2 wherein the evaporator section 14 is disposed at a negative slope, the distal end 26 of the evaporator section 14 is not the lowest point of the thermosyphon 10.

The condensate return tube 24 can be restrained from contact with inner wall surfaces of the evaporator section 14 by means of standoff elements 28 which function merely to hold the tube 24 at a suitable spacing from the inner walls of the evaporator section 14. As is apparent from the foregoing, the distal end of the condensate return tube 24 is open in order to allow discharge of the condensate from the said tube 24.

In a typical installation, the evaporator section 14 of thermosyphon 10 can be approximately 30 feet in length although the section 14 can be either shorter or longer depending upon the application. Wall portions of the condenser section 12 and of the evaporator section 14 can be formed of a material such as copper, steel, etc. Suitable working fluids include the freons carbon dioxide and ammonia, it being necessary to utilize steel as the construction material when ammonia is utilized as the working fluid. The condensate return tube 24 can be formed of one of the "plastics" such as polystyrene, etc. The collector ring 22 can similarly be formed of a "plastics" material, a primary characteristic of the material forming the collector ring 22 being that the material does not react with the working fluid being used within the thermosyphon 10.

In the thermosyphon 10 of FIG. 2, the working fluid condensed within the condenser section 12 would flow to the bend 16 and puddle without moving any further into the evaporator section 14 if the collector ring 22 and condensate return tube 24 were not provided within the struction. Due to the negative slope of the evaporator section 14 of the thermosyphon 10 of FIG. 2, all cooling would take place at or near the bend 16. The bend 16 is not necessarily or usually the mark (delineation) between the condenser and evaporator sections. However, disposition of the collector ring 22 as shown in FIG. 3 causes the collection of the condensate at an elevation above the bend 16 and above the distal end of 14 with the condensate then being ducted to the end of the evaporator section 14. The slope of the evaporator section 14 can then be zero or even negative as is shown.

In operation, the thermosyphons 10 of FIGS. 2 and 3 function in the same manner. Condensed working fluid delivered through the condensate return tube 24 to the distal end 26 of each of the thermosyphons 10 is evaporated within the evaporator section 14 due to heat present in the permafrost foundation 18, the evaporated working fluid moving within the evaporator section 14 toward and through the bend 16 and into the condenser section 12 wherein the working fluid is condensed. The condensate then flows downwardly into the collector ring 22 for return through the tube 24 to the distal end 26 of said thermosyphon 10. The thermosyphon 10 thus functions continuously (as long as the air temperature remains cold) to remove heat from permafrost foundation and therefore act to keep the permafrost foundation in a frozen condition.

It is to be understood that the invention can be used in environments other than that specifically described hereinabove. Further, the thermosyphon of the invention can be configured other than as explicitly described herein without departing from the scope of the invention as recited in the appended claims.

I claim:

1. A thermosyphon comprising:
   a. a condenser section;
   b. a evaporator section disposed at a negative slope;
   c. a working fluid evaporated within the evaporator section and condensed within the condenser section to transfer heat from the environment of the evaporator section to the environment of the condenser section;
   d. means disposed within the condenser section for collecting condensed working fluid; and,
   e. means communicating with the collecting means for ducting the condensed working fluid from the collecting means to the evaporator section.

2. In the thermosyphon of claim 1 wherein the collecting means comprises an annular ring having a parametric outer edge fitting flushly against inner walls of the condenser section, evaporator working fluid entering the condenser section from the evaporator section passing centrally through the annular ring and condensing on inner walls of said condenser section, the condensed working fluid flowing downwardly along the inner walls of the condenser section and being collected by the annular ring.

3. In the thermosyphon of claim 2 wherein the ducting means comprises a tubular element extending from the annular ring into the evaporator section, the condensed working fluid flowing from the ring through the tubular element into the evaporator section.

4. In the thermosyphon of claim 3 and further comprising means carried by the tubular element for preventing the tubular element from contacting inner walls of the evaporator section.

5. In the thermosyphon of claim 3 wherein the evaporator section is disposed horizontally relative to the condenser section.

6. In the thermosyphon of claim 3 wherein the evaporator section is disposed in a permafrost foundation and the condenser section is disposed in the air.

7. In the thermosyphon of claim 3 wherein the tubular element carries the condensed working fluid to the end of the evaporator section which is furthest from the condenser section.

8. In the thermosyphon of claim 1 and further comprising means carried by the ducting means for preventing the ducting means from contacting inner walls of the evaporator section.

9. In the thermosyphon of claim 1 wherein the ducting means carries the condensed working fluid to the end of the evaporator section which is furthest from the condenser section.

10. A method for using a phase-change thermosyphon for continuously transferring heat from an evaporator section to a condenser section thereof when the evaporator section is disposed within a relatively warm environment at a horizontal disposition or in a negatively sloped disposition, comprising the steps of:
    collecting the condensed working fluid with the condenser section; and,
    ducting the collected condensed working fluid in to the evaporator section.

11. The method of claim 10 wherein the collected condensed working fluid is directed to the end of the evaporator section furthest from the condenser section.

12. A thermosyphon comprising:
    a. a condenser section;
    b. a evaporator section disposed at a zero angle;
    c. a working fluid evaporated within the evaporator section and condensed within the condenser section to transfer heat from the environment of the evaporator section to the environment of the condenser section;
    d. means disposed within the condenser section for collecting condensed working fluid; and,
    e. means communicating with the collecting means for ducting the condensed working fluid from the collecting means to the evaporator section.

13. In the thermosyphon of claim 12 wherein the collecting means comprises an annular ring having a parametric outer edge fitting flushly against inner walls of the condenser section, evaporator working fluid entering the condenser section from the evaporator section passing centrally through the annular ring and condensing on inner walls of said condenser section, the condensed working fluid flowing downwardly along the inner walls of the condenser section and being collected by the annular ring.

14. In the thermosyphon of claim 13 wherein the ducting means comprises a tubular element extending from the annular ring into the evaporator section, the condensed working fluid flowing from the ring through the tubular element into the evaporator section.

15. In the thermosyphon of claim 14 and further comprising means carried by the tubular element for preventing the tubular element from contracting inner walls of the evaporator section.

16. In the thermosyphon of claim 14 wherein the evaporator section is disposed horizontally relative to the condenser section.

17. In the thermosyphon of claim 14 wherein the evaporator section is disposed in a permafrost foundation and the condenser section is disposed in the air.

18. In the thermosyphon of claim 14 wherein the tubular element carries the condensed working fluid to the end of the evaporator section which is furthest from the condenser section.

19. In the thermosyphon of cliam 12 and further comprising means carried by the ducting means for preventing the ducting means from contacting inner walls of the evaporator section.

20. In the thermosyphon of claim 12 wherein the ducting means carries the condensed working fluid to the end of the evaporator section which is furthest from the condenser section.

* * * * *